March 1, 1966 D. E. MARPE 3,238,389
SIGNAL RESPONSIVE APPARATUS
Filed Dec. 17, 1962
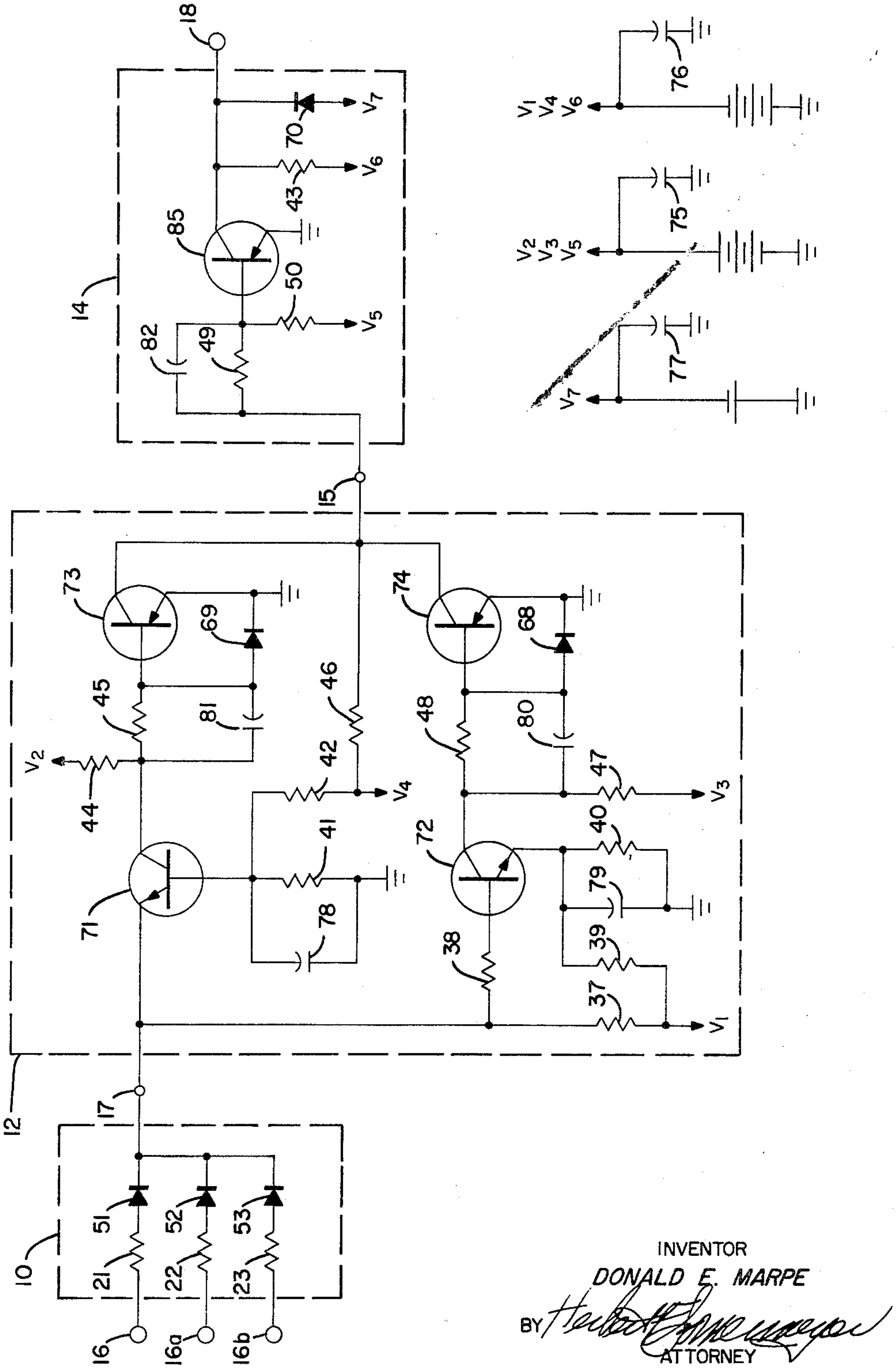
INVENTOR
DONALD E. MARPE
BY
ATTORNEY

United States Patent Office 3,238,389
Patented Mar. 1, 1966

3,238,389

SIGNAL RESPONSIVE APPARATUS

Donald E. Marpe, Bloomington, Minn., assignor to Sperry Rand Corporation, New York, N.Y., a corporation of Delaware

Filed Dec. 17, 1962, Ser. No. 245,152
5 Claims. (Cl. 307—88.5)

This invention relates in general to pulse type solid-state logic circuits, and in particular to such a circuit that provides a specified output only upon selection of one out of a plurality of inputs.

With the advent of mass production of digital computers, it has become increasingly desirable to utilize large numbers of similar circuits packaged in individual plug-in modules or "card-types." This invention involves one such module designated "tape unit select error-detector" whose function is to detect an "illegal" selection of tape units that are controlled by the tape unit control unit of a data processing system. As only one tape unit is to be selected at any one time, an "illegal" selection is defined as the selection of none or more than one tape unit during each tape unit selection period.

Accordingly, it is a primary object of this invention to provide a solid state logic module.

Another object of this invention is to provide a solid-state module capable of providing sufficient output power to drive six logic modules.

A further object of this invention is to provide a solid-state module capable of detecting a selection of none or more than one of a plurality of inputs.

A still further object of this invention is to provide a solid-state module capable of detecting an illegal selection of a number of inputs and providing an error signal to initiate selection control correction.

These and other more detailed and specific objectives will be disclosed in the course of the following specification, reference being had to the accompanying drawings, in which the single figure illustrates an examplary embodiment of this invention wherein there is illustrated an electrical circuit capable of detecting the selection of none or more than one of 16 inputs and presenting an error signal at a single output.

As stated above, the invention disclosed herein provides an error signal indicative of the non-selection or plural-selection of a plurality of input terminals. In this embodiment normal, non-selection voltages applied at input terminals are of a —3 volt level, while selection voltages applied at the input terminals are of a ground potential. Error signals at the output terminal are of a —3 volt level, while the no-error signal at the output is of a ground potential. Table A presents the relationship of the input and output signal levels and error indications utilized in the exemplary embodiment of the single figure. This embodiment may be thought of as consisting of three essential parts: input means 10, detector means 12, and output means 14. Input means 10 may have a plurality of input terminals 16—it only being necessary that there be at least two input terminals for this circuit to provide an error indication upon the selection of none or more than one input terminal—while output means 14 has at least a single output terminal 18.

*Table A*

| Input | Output |
|---|---|
| No 0 volts, all —3 volts (non-selection, illegal). | —3 volts, error indication. |
| One zero volts, all others —3 volts, (single selection, legal). | 0 volts, no error indication. |
| More than one zero volts, all others —3 volts, (plural selection, illegal). | —3 volts, error indication. |

In order to facilitate an understanding of the operation of this invention, the following group of actual values for the components of the illustrated embodiment are presented. It should be understood that the principals of operation of this circuit may be present in circuits having a wide range of individual specification, so that the list of values here presented should not be construed as a limitation.

| Components: | Type number or identification |
|---|---|
| Resistors **21**, **22**, **23** | 1.4K±2%, ¼ watt, deposited film. |
| Resistor **37** | 8.25K±2%, ¼ watt, deposited film. |
| Resistor **38** | 470 ohms±5%, ½ watt, carbon composition. |
| Resistors **39** and **42** | 909 ohms±1%, ½ watt, deposited film. |
| Resistor **40** | 162 ohms±1%, ½ watt, deposited film. |
| Resistor **41** | 243 ohms±1%, ½ watt, deposited film. |
| Resistor **43** | 2K ohms±5%, ½ watt, carbon composition. |
| Resistor **44** | 39K±5%, ½ watt, carbon composition. |
| Resistor **45** | 7.5K±5%, ½ watt, carbon composition. |
| Resistor **46** | 3.9K±5%, ½ watt, carbon composition. |
| Resistors **47** and **50** | 18K±5%, ½ watt, carbon composition. |
| Resistor **48** | 4.3K±5%, ½ watt, carbon composition. |
| Resistor **49** | 910 ohms±5%, ½ watt, carbon composition. |
| Diodes **51**, **52**, **53**, **68**, **69** and **70** | Germanium, 1N695. |
| Transistors **71** and **72** | NPN type, 2N1308. |
| Transistors **73**, **74** and **85** | PNP type, 2N705. |
| Capacitors **75** and **76** | 0.01 microfarad+80 —20%, 100 volt ceramic. |
| Capacitor **77** | 0.1 microfarad+80 —20%, 28 volt ceramic. |
| Capacitors **78** and **79** | 1 microfarad±20%, 35 volt, tantalum. |
| Capacitor **80** | 470 micro - microfarad±5%, 500 volt, ceramic. |
| Capacitors **81** and **82** | 100 micro-microfarad±10%, volt, ceramic. |
| $V_2$, $V_3$ and $V_5$ | +15 volts. |
| $V_1$, $V_4$ and $V_6$ | —15 volts. |
| $V_7$ | —3 volts. |

Using the above values, the following signal relationships are utilized:

Outputs:
- (A) Error indication —3.0 (+0.0, —0.75) volts
- (B) No error indication 0.0 (+0.0, —0.5) volt Input:
- (A) Select voltage 0.0 (+0.0, —0.25) volt
- (B) Non-select voltage —3.3 (+0.0, —0.45) volts.

As stated above, the operating input signals applied to the input terminals 16 of input means 10, are either a non-select signal level of —3 volts, or a select signal level of 0 volt, i.e., ground potential. With all input terminals 16 at the non-select —3 volt level, a —3 volt error signal is presented at output terminal 18 as follows. With all input terminals 16 held negative, input node 17 attempts to assume the —15 volt level of $V_1$ through resistor 37. Transistor 71 is biased at approximately —3.1 volts by the voltage divider network made up of resistors 41 and 42 which is between ground potential and the —15 volts of $V_4$. Input node 17 is effectively clamped to approximately —3.2 volts by transistor 71 which is operating in the saturated mode. The collector load of transistor 71, which consists of resistors 44 and 45, in turn provides sufficient base drive to cause transistor 73 to operate in the saturated mode. With transistor 73 operating in the saturated mode, node 15 is held near ground potential. The voltage divider network consisting of resistors 49 and 50, coupled through the 15 volts of $V_5$, biases transistor 85 into the non-conducting mode. With transistor 85 non-conducting, output terminal 18 is clamped to —3 volts by conduction through diode 70 and resistor 43 between the —15 volts of $V_6$ and the —3 volts of $V_7$. Transistor 72 is biased to approximately —2.3 volts by the voltage divider network consisting of resistors 39 and 40 between ground potential and the —15 volts of $V_1$. Since input node 17 will be at approximately —3.2 volts, transistor 72 will be held in the non-conducting mode. With transistor 72 non-conducting, transistor 74 will also be held in the non-conducting mode because of the reverse bias applied through resistors 47, 48 and diodes 68 from the +15 volts of $V_3$.

If one input terminal, such as input terminal 16*a*, has a select ground potential applied thereto, and all others are open-circuited or at a —3 volt non-select level, a ground potential is presented at output terminal 18. With terminal 16*a* at ground potential, input node 17 assumes a potential more positive than —3.1 volts but less positive than —2.3 volts and transistors 71 and 72 will be biased off into the non-conducting mode. Transistor 74 will be held in the non-conducting mode, as outlined above, and transistor 73 will be held in the non-conducting mode because of the reverse bias applied to resistors 44 and 45 and diode 69. With both transistors 73 and 74 held in the non-conducting mode, node 15 is allowed to go negative. Sufficient base drive is provided to resistors 46 and 49 from the —15 volts of $V_4$ to drive transistor 85 into the saturated mode. This raises the potential of output terminal 18 to approximately ground potential indicative of no-error selection.

If two or more input terminals, such as input terminals 16*a* and 16*b*, are at ground potential, the potential of input node 17 will raise more positive than —2.3 volts, causing transistor 72 to operate in the conducting mode. Transistor 71, and consequently transistor 73, remain held in the non-conducting mode due to the increase in reverse bias on the emitter of transistor 71. With transistor 72 operating in the conducting mode, node 15 is raised to a negative potential and sufficient base drive is provided to resistor 48 to cause transistor 74 to operate in the saturated mode. The potential of node 15 is held near ground potential by transistor 74 while transistor 85 is held in the non-conducting mode in the same manner as when no input terminal 16 were at a positive potential. The potential of output terminal 18 is clamped to the —3 volts of $V_7$ as explained above.

If all input terminals 16 are at a positive potential level, input node 17 may approach ground potential. Under this condition, resistor 48 functions to prevent overdriving transistor 72. Diodes 69 and 68 function to limit the reverse base voltage of transistors 73 and 74, respectively, to a safe level, when transistors 71 and 72 are off. Additionally, capacitor 80, 81 and 82 function to speed up signal propagation through the circuit to keep the signal delay time to a minimum.

It is understood that suitable modifications may be made in the structure as disclosed provided such modifications come within the spirit and scope of the appended claims. Having now, therefore, fully illustrated and described my invention, what I claim to be new and desire to protect by Letters Patent, is:

1. Signal responsive means comprising: input means; output means; detector means coupling said input means and said output means; said input means including at least two input terminals; said output means including at least one output terminal; means capable of separately coupling either one of at least two different voltage level input signals to separate ones of said input terminals; said detector means detecting the respective coupling of said two input signals to said input terminals by the reaction of first and second transistor means parallel arranged between said input means and said output means; said first and second transistor means caused to be non-conductive only when said first input signal is coupled to only one of said input terminals and said second input signal is coupled to all remaining input terminals; the reaction of said first and second transistor means to said first and second input signals causing a first output signal to be presented at said output terminal only if the first of said input signals is coupled to only one of said input terminals.

2. Signal responsive apparatus, comprising:
- a first voltage level source;
- a second voltage level source;
- a detector circuit having at least first and second parallel arranged control circuits common coupled between at least two input terminals and at least one output terminal;
- each of said control circuits having a biasing means and at least two serially arranged transistor means;
- said first and second control circuit biasing means biasing their respective serially arranged transistor means into the non-conductive mode causing a first output signal level to appear at said output terminal only when said first voltage level source is coupled to only one of said input terminals and said second voltage level source is coupled to the remaining input terminals.

3. The apparatus of claim 2 wherein said two serially arranged transistor means of said first and second control circuits are of a first and a second conductivity type.

4. The apparatus of claim 3 further including an output transistor means intermediate said parallel arranged control circuits and said output terminal.

5. The apparatus of claim 4 wherein said output transistor is of said second conductivity type.

References Cited by the Examiner

UNITED STATES PATENTS

| | | | |
|---|---|---|---|
| 2,850,647 | 9/1958 | Fleisher | 307—88.5 |
| 3,094,632 | 6/1963 | Wartella | 307—88.5 |

ARTHUR GAUSS, *Primary Examiner.*

D. D. FORRER, *Assistant Examiner.*